3,402,099
LAMINATED SAFETY GLASS
Donald I. Christensen, East Longmeadow, Mass., assignor to Monsanto Company, St. Louis, Mo., a corporation of Delaware
No Drawing. Filed Aug. 3, 1965, Ser. No. 476,993
16 Claims. (Cl. 161—199)

This invention relates to improved laminated safety-glass. More particularly, this invention relates to laminated safety-glass having an interlayer of a plasticized polyvinyl acetal containing at least one organic acid which has higher resistance to penetration by an impacting object.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of serious injury which may occur when a head strikes the windshield, while also supplying added resistance to penetration.

The interlayers in present day commercial windshields usually contain about 0.1 to 0.8% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

Prior to this time only alkaline maerials such as sodium and potassium hydroxides or alkaline salts prepared from these bases and an acid have been added to polyvinyl acetal interlayers to stabilize the resin and/or to improve impact strength. However, these alkaline materials, when present at higher titer levels, cause discoloration in the resin when the interlayer or the laminated structure is subjected to high temperatures. A need exists for an interlayer which will improve the penetration resistance of the laminate without undergoing discoloration under high temperature conditions.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in laminated safety-glass by bonding two glass panels with an interlayer of a plasticized polyvinyl acetal resin; said interlayer having a moisture content of 0.1 to 0.8% by weight and containing from 0.01 to 3.0 parts by weight per hundred parts by weight of resin of at least one organic acid which is selected from the group consisting of monocarboxylic acids of from 6 to 22 carbon atoms, dicarboxylic acids of from 4–12 carbon atoms, aliphatic monoamino monocarboxylic acids of from 2 to 6 carbon atoms, aliphatic monoamin dicarboxylic acids of from 4 to 5 carbon atoms, citric acids and mixtures thereof.

The Alkalinity Titer is the number of cubic centimeters of 0.01 normal hydrochloric acid required to neutralize 100 grams of the polyvinyl acetal resin. This is an arbitrary standard used to designate the alkalinity of the resin. The Alkalinity Titer is usually determined after plasticization by dissolving 5 grams of the polyvinyl acetal resin in 250 cc. of preneutralized ethyl alcohol and titrating with 0.005 normal hydrochloric acid to the endpoint using brom-phenol blue indicator and calculating from the result obtained to determine the cubic centimeters of 0.01 normal acid required for 100 grams resin.

Heretofore it has been customary to stabilize polyvinyl acetals for interlayers with potassium or sodium hydroxide and/or potassium or sodium acetate by adding small amounts of these materials during the preparation of the polyvinyl acetal. The presence of such alkaline materials produces the Alkalinity Titer in conventional polyvinyl acetal interlayers.

This Alkalinity Titer is considered to be a standard in the industry for measuring the alkalinity of the resin. Until now virtually all the resin used in interlayers has been alkaline in nature. In order to fit this novel invention into the framework of the traditional terminology the old concept of Alkalinity Titer is maintained. However, whenever the resin is acidic due to the addition of the organic acids of this invention, a negative Alkalinity Titer is determined by dissolving 5 grams of the polyvinyl acetal resin in 250 cc. of preneutralized ethyl alcohol and titrating with 0.005 normal sodium hydroxide to the endpoint using brom-phenol blue indicator and calculating from the result obtained to determine the cubic centimeters of 0.01 normal sodium hydroxide required for 100 grams resin.

This negative Alkalinity Titer is used as above to designate the acidity of the resin. The positive Alkalinity Titers are considered to be higher titers than the negative Alkalinity Titers with the usual conventions for positive and negative numbers being observed.

Normally polyvinyl acetals have an Alkalinity Titer of from 5 to 95 due to alkaline materials used in the manufacturing process. Such resins may be washed free of these alkaline materials (as described below) to provide resins which have a zero titer. In this event, the addition of the organic acids of this invention will result in a negative Alkalinity Titer.

An alternate approach is to add the organic acids of this invention to the stock polyvinyl acetals having an Alkalinity Titer greater than zero due to the manufacturing process. In this event the organic acids will decrease the original titer of the resins but not necessarily to the negative Alkalinity Titer levels.

The following examples are given in illustration of the invention and are not intended as limitations thereof. All parts and percentages are by weight unless otherwise specified.

This example along with Examples II, III and IV are used as controls in order to show the increase in impact resistance obtained when using organic acid additives in the practice of this invention. Results are listed in Table I.

EXAMPLE I

Example I uses a conventional polyvinyl acetal interlayer for safety-glass. It is a polyvinyl butyral containing 18.8% vinyl alcohol by weight and having an Alkalinity Titer of 20. This titer is due to 0.02 part by weight of potassium acetate per hundred parts by weight of resin in the polyvinyl butyral. The resin is plasticized with 42 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls. Sets of ten glass laminates are individually prepared by interposing the 15 gauge interlayers between two 24 x 36 x 0.125 inch panels of glass and by interposing the 30 guage interlayer between two 12 x 12 x 0.125 inch panels of glass. The resulting laminates are then subjected to a temperature of about 275° F. at a pressure of 185 p.s.i. for approximately 10 minutes to bond the laminate or panels together.

The laminates prepared by the above procedure are then subjected to Mean Break Height tests according to the recently established tentative specifications set up by the Society of Automotive Engineers, the Subcommittee on Automotive Glazing and the results tabulated in Table I.

In essence, the Mean Break Height test comprises placing the laminate in a horizontal position with a frame or edge support and while maintaining a laminate temperature of 70° F., allowing a 22-pound spherical ball (referred to as a head form) to drop from a designated height against approximately the middle of the laminate prepared with the 15 gauge interlayer. A 5 pound steel ball is used on the smaller laminate made with the 30 gauge interlayer. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object.

EXAMPLE II

Another set of 10 glass laminates are prepared and tested as in Example I using a resin with an Alkalinity Titer of 42 due to 0.04 part by weight potassium acetate per hundred parts by weight of resin (phr.). These laminates do not show the superior impact resistance that one achieves when using the organic acids of this invention.

In all of the following examples, the resin used has an initial Alkalinity Titer of about 20 due to potassium acetate. The titer values listed in the Table are the final titers after the resin/acid blend has come to equilibrium.

EXAMPLE III

Another set of 10 glass laminates are prepared and tested as in Example I. In this example, the interlayer is sprayed with aqueous hydrochloric acid prior to making the laminate. The poorer impact resistance of the laminate (see Table I) illustrates that not all acids are useful in improving the impact strength of a laminate in accordance with the practice of this invention.

EXAMPLE IV

Further sets of glass laminates are prepared as in Example III but using sulphuric acid instead of hydrochloric. Once again, the Mean Break Height is lower than when using organic acids of this invention as is evidenced by a comparison of the data in Tables I and II.

Results for Examples I–IV are listed in Table I.

TABLE I.—CONTROL SAMPLES

| Example | Acid | Titer, cc. | Percent $H_2O$ | Mean Break Height (feet) | |
|---|---|---|---|---|---|
| | | | | 15 gauge | 30 gauge |
| I | None | 20 | 0.40 | 2.3 | 7.0 |
| II | do | 42 | 0.43 | 2.4 | 7.2 |
| III | HCl | | 0.38 | 2.0 | 6.8 |
| IV | $H_2SO_4$ | | 0.41 | 2.1 | 6.6 |

The following examples are intended to show the increase in Mean Break Height that is obtained when certain organic acids are incorporated into the interlayer.

TABLE II (EXAMPLES V–XIV).—MONOCARBOXYLIC ACIDS

| Example | Acid | Parts (Phr.)* | Titer Value, cc. | Percent $H_2O$ | Mean Break Height (ft.) | |
|---|---|---|---|---|---|---|
| | | | | | 15 gauge | 30 gauge |
| V | Caproic | 0.22 | 12 | 0.43 | 4.3 | 14.2 |
| VI | Decanoic | 0.17 | 16 | 0.37 | 6.9 | 16.1 |
| VII | do | 0.40 | 1 | 0.35 | 7.7 | 19.4 |
| VIII | Lauric | 0.10 | 14 | 0.34 | 3.5 | 10.3 |
| IX | do | 0.20 | 10 | 0.39 | 5.6 | 15.3 |
| X | do | 0.30 | 7 | 0.45 | 7.7 | 19.4 |
| XI | Stearic | 0.05 | 19 | 0.38 | 2.3 | 9.0 |
| XII | do | 0.15 | 12 | 0.35 | 6.3 | 17.2 |
| XIII | do | 0.29 | 9 | 0.38 | 7.4 | 19.2 |
| XIV | do | 0.40 | 4 | 0.42 | 7.8 | 19.7 |

*(Phr.)—parts of acid by weight per hundred parts by weight of resin.

The significant increase in impact resistance of the laminates that occurs when one uses monocarboxylic acids in the practice of this invention becomes apparent when the Mean Break Heights of the laminates in Table II are compared to those of the control samples in Table I. The control laminates made with 30 gauge interlayer have Mean Break Heights of about 7 feet while those laminates containing as little as 0.05 part of an organic monocarboxylic acid (Example XI) have a Mean Break Height of about 9 feet. Even greater Mean Break Heights are achieved as the concentration of acid increases.

The results obtained with dicarboxylic acid additives are listed in Table III.

TABLE III (EXAMPLES XV–XVII).—DICARBOXYLIC ACIDS

| Example | Acid | Parts (Phr.) | Titer, cc. | Percent $H_2O$ | Mean Break Height (feet) | |
|---|---|---|---|---|---|---|
| | | | | | 15 gauge | 30 gauge |
| XV | Succinic | 0.01 | 18 | 0.34 | 4.0 | 10.8 |
| XVI | do | 0.03 | 13 | 0.39 | 6.2 | 17.1 |
| XVII | do | 0.06 | 7 | 0.37 | 7.8 | 19.2 |
| XVIII | Adipic | 0.02 | 13 | 0.42 | 6.3 | 17.3 |
| XIX | do | 0.04 | 12 | 0.39 | 7.8 | 19.1 |
| XX | do | 0.07 | 5 | 0.41 | 8.3 | 20.1 |
| XXI | Sebacic | 0.10 | 14 | 0.40 | 3.2 | 9.8 |
| XXII | do | 0.15 | 11 | 0.36 | 5.6 | 13.5 |
| XXIII | do | 0.20 | 9 | 0.38 | 7.8 | 18.3 |
| XXIV | do | 0.25 | 6 | 0.39 | 7.9 | 18.9 |
| XXV | Tartaric | 0.04 | 5 | 0.40 | 5.1 | 13.4 |
| XXVI | do | 0.08 | −11 | 0.48 | 5.9 | 15.2 |
| XXVII | do | 0.10 | −26 | 0.45 | 7.1 | 18.4 |

A comparison of the Mean Break Heights in Table III with those of the control samples in Table I illustrates the improved impact resistance achieved when using as little as 0.01 part of an organic dicarboxylic acid (Example XXI). Better impact resistance is obtained as the concentration of the acid increases (Examples XXII–XXIII).

The experimental data on aliphatic amino acids is tabulated below in Table IV.

TABLE IV (EXAMPLES XXVIII–XXXI).—ALIPHATIC AMINO ACIDS

| Example | Acid | Parts (Phr.) | Titer, cc. | Percent $H_2O$ | Mean Break Height (feet) | |
|---|---|---|---|---|---|---|
| | | | | | 15 gauge | 30 gauge |
| XXVIII | Glycine | 0.15 | 16 | 0.40 | 8.4 | 20.3 |
| XXIX | Alanine | 0.18 | 17 | 0.39 | 8.0 | 19.4 |
| XXX | Glutamic | 0.29 | 5 | 0.41 | 8.3 | 20.5 |
| XXXI | Aspartic | 0.27 | −11 | 0.38 | 7.9 | 19.2 |

The superior impact resistance of the laminates made with interlayers containing aliphatic amino acids over the control samples may be readily seen by a comparison of the Mean Break Heights in Tables I and IV.

Equally useful as an interlayers additive to increase impact resistance is citric acid, a hydroxy tricarboxylic acid. Results obtained using citric acid are tabulated in Table V.

TABLE V (EXAMPLES XXXII–XXXVI).—CITRIC ACID

| Example | Acid | Parts (Phr.) | Titer, cc. | Percent H₂O | Mean Break Height (feet) | |
|---|---|---|---|---|---|---|
| | | | | | 15 gauge | 30 gauge |
| XXXII | Citric | .03 | 9 | 0.72 | 2.4 | 7.2 |
| XXXIII | do | .07 | −7 | 0.40 | 2.7 | 7.9 |
| XXXIV | do | 0.1 | −22 | 0.35 | 5.8 | 16.9 |
| XXXV | do | 0.21 | −58 | 0.44 | 8.1 | 18.3 |
| XXXVI | do | 2.0 | −877 | 0.41 | 5.3 | 14.8 |

The laminates listed in Table V show superior impact resistance over those of the control laminates in Table I.

The following example, XXXVII, is presented to show the improved color properties obtained when using organic acids in the practice of this invention.

EXAMPLE XXXVII 30 mil films of the interlayer of Examples I–II and V–XXXV are sandwiched between two layers of Teflon and placed in a 350° F. oven for periods of 15, 30 and 60 minutes. The control samples show brown discoloration after 15 minutes. In general, samples containing organic acid show less discoloration after 60 minutes than do the control samples after 15 minutes. The amount of color formed is in proportion to the titer level, i.e., the highest Alkalinity Titer samples formed the most color even after 60 minutes.

The laminated safety-glass of this invention is especially efficient in that the improved resistance to penetration is balanced over a wide temperature range. The impact tests shown in the examples are conducted at room temperature, however, tests conducted at as low as 40° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact the use of an 0.030 inch interlayer containing these organic acids results in Mean Break Heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 25 m.p.h. In other words, at normal interlayer moisture contents, if at least one organic acid is incorporated into the interlayer in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low, i.e., 0.1 to 0.8%.

Higher moisture levels are undersirable because of the tendency to cause bubbles or blisters in the laminate. Lower moisture levels are especially difficult to attain and maintain, and in fact, it appears as if some amount of moisture is desirable. It is preferable that the interlayers have a moisture content of 0.2 to 0.6%.

Table VI illustrates the lack of effect of moisture within the normal moisture range in the absence of any salts on the impact strength of various sets of glass laminates. The plasticized interlayer sheets having an Alkalinity Titer of zero are prepared from a resin thoroughly washed after swelling in alcohol-water as described below.

TABLE VI.—EFFECT OF MOISTURE ON MEAN BREAK HEIGHT

| Alkalinity Titer | Percent Moisture Content | Mean Break Height (Feet) | |
|---|---|---|---|
| | | 15 gauge Interlayer | 30 gauge Interlayer |
| 0 | .06 | 2.3 | 7.5 |
| 0 | .31 | 2.4 | 7.7 |
| 0 | .37 | 2.4 | 7.8 |
| 0 | .50 | 2.8 | 8.0 |
| 0 | .75 | 3.0 | 8.3 |

The maximum preferred Alkalinity Titer level of the interlayer is about 90 with lower titer levels being especially preferred. This titer level is contingent on the amount and type of acid used as well as on the initial titer of the polyvinyl acetal resin. As was pointed out above, it is customary to add alkaline materials during the production of polyvinyl acetals in order to stabilize the resins. One may produce polyvinyl acetals at titer levels from 5 to 95 depending on the process used. Also, it is possible to wash a high Alkalinity Titer resin free of alkaline material until the titer is essentially zero as is described below. When starting with a zero Alkalinity Titer resin, one will end up with a negative Alkalinity Titer by adding the organic acids of this invention, while the organic acids will lower the titers of those resins whose Alkalinity Titer is greater than zero.

The concept of this invention contemplates starting with a polyvinyl acetal that has an Alkalinity Titer of zero or greater and ending up with an interlayer that has a titer at or preferably below 90, wherein the decrease in titer level is due to the organic acid additive.

When a 20 Alkalinity Titer polyvinyl acetal is used as the starting material, a titer of less than 18 is especially preferred. The final titer of the interlayer also depends to some extent on the acid used as well as the amount of acid. Such acids as tartaric and citric are much stronger acids than lauric, succinic, glycine, etc. and cause a greater drop in the titer level at approximately the same concentrations.

In terms of parts by weight the preferred embodiment is from 0.01 to 3.0 parts of organic acid by weight per hundred parts by weight of resin.

The organic acid may be added to the polyvinyl acetal in any of several ways. One preferred method is to dissolve the acid in water or ethyl alcohol and add this to the resin. Uniform dispersion of the acid throughout the interlayer is achieved by comalaxating the mixture in a sigma bladed blender. In the event that the organic acid is insoluble in water or alcohol, it is added in powdered form to the molten resin and blended in a sigma bladed blender.

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The organic monocarboxylic acids which are employed in the practice of this invention are those of from 6 to 22 carbon atoms, e.g., caproic, heptoic, caprylic, pelargonic, capric, undecyclic, lauric, tridecylic, myristic, pentadecylic, palmitic, margaric, stearic, mondecyclic, arachidic, etc. Those monocarboxylic acids containing less than 6 carbon atoms are generally unsuitable because of their low boiling point and the danger of bubble formation within the laminate.

The organic dicarboxylic acids which are employed in the practice of this invention are those of from 4 to 12 carbon atoms, e.g., succinic, glutaric, adipic, pimelic, suberic, azelaic, sebaic, etc. Surprisingly enough the lower dicarboxylic acids cause a decrease in impact strength and such acids as oxalic are unacceptable in the practice of this invention.

Also useful are the chloro and hydroxy substituted derivatives of the mono and dicarboxylic acids listed above, e.g., chlorosuccinanic, tartaric, hydroxycaproic, chloroadipic, etc.

The aliphatic monoamino monocarboxylic acids which are employed in this invention are those containing from 2 to 6 carbon atoms, e.g., glycine, alanine, serine, threonine, valine, leucine, etc.

One may also use aliphatic monoamino dicarboxylic acids of from 4 to 5 carbon atoms, e.g., aspartic, glutamic, hydroxyglutamic, etc.

Mixtures of all of the above are also contemplated.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430 dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general, the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate, groups, calculated as polyvinyl ester, e.g., acetate, and the balance substantially acetal. When the acetal is butyraldehyde acetal, the polyvinyl acetal resin will preferably contain, on a weight basis, from 9 to 30% hydroxyl groups, calculated as polyvinyl ester, the balance being substantially butyraldehyde acetal.

The resin prepared according to the above methods will contain approximately 5 to 95 cc. Alkalinity Titer composed generally of potassium acetate or sodium acetate depending on the process used. In order to replace these salts with the organic acids of this invention, the resin is swelled in a mixture of alcohol-water (0.960 sp. gr.) at about 40° C. for about 1 hour and then washed thoroughly with water until the dried resin is neutral to bromophenol blue in the Alkalinity Titer test. Appropriate amounts of the organic acids of this invention may then be added to the washed zero Alkalinity Titer resin, according to any of the above mentioned methods.

This invention also contemplates adding the organic acids to polyvinyl acetal resins which have not been washed to a zero titer.

The resin produced may be plasticized to the extent of about 20 to 60 parts plasticizer per 100 parts resin and more commonly between 35 and 50 parts for normal windshield use. This latter concentration is generally used with polyvinyl butyrals containing 17 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di(beta-butoxyethyl) adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. An improved interlayer for laminated safety-glass comprising a plasticized polyvinyl acetal resin; said interlayer having a moisture content of 0.1 to 0.8% and containing from 0.01 to 3.0 parts by weight per hundred parts by weight of resin of at least one organic acid which is selected from the group consisting of monocarboxylic acids of from 6 to 22 carbon atoms, dicarboxylic acids of from 4–12 carbon atoms, aliphatic monoamino monocarboxylic acids of from 2 to 6 carbon atoms, aliphatic monoamino dicarboxylic acids of from 4 to 5 carbon atoms, citric acid and mixtures thereof.

2. An improved interlayer as in claim 1 wherein the polyvinyl acetal is polyvinyl butyral.

3. An improved interlayer as in claim 2 wherein the polyvinyl butyral has a vinyl alcohol content of from 9 to 30% by weight and is plasticized with from 20 to 60 parts of plasticizer per 100 parts polyvinyl butyral.

4. An improved interlayer as in claim 2 wherein the organic acid is lauric acid.

5. An improved interlayer as in claim 2 wherein the organic acid is succinic acid.

6. An improved interlayer as in claim 2 wherein the organic acid is tartaric acid.

7. An improved interlayer as in claim 2 wherein the organic acid is glutamic acid.

8. An improved interlayer as in claim 2 wherein the organic acid is citric acid.

9. An improved laminated safety-glass comprising two layers of glass bonded to a plasticized polyvinyl acetal interlayer; said interlayer having a moisture content of 0.1 to 0.8% and containing from 0.01 to 3.0 parts by weight per hundred parts by weight resin, of at least one organic acid which is selected from the group consisting of monocarboxylic acids of from 7 to 22 carbons, dicarboxylic acids of from 4–12 carbons, aliphatic monoamino monocarboxylic acids of from 2 to 6 carbon atoms, aliphatic monoamino dicarboxylic acids of from 4 to 5 carbon atoms, citric acid and mixtures threof.

10. An improved laminated safety-glass as in claim 9 wherein the polyvinyl acetal is polyvinyl butyral.

11. An improved laminated safety-glass as in claim 10 wherein the polyvinyl butyral has a vinyl alcohol content of from 9 to 30% by weight and is plasticized with from 20 to 60 parts of plasticizer per 100 parts polyvinyl butyral.

12. An improved laminated safety-glass as in claim 9 wherein the organic acid is lauric acid.

13. An improved laminated safety-glass as in claim 9 wherein the organic acid is succinic acid.

14. An improved laminated safety-glass as in claim 9 wherein the organic acid is glutamic acid.

15. An improved laminated safety-glass as in claim 9 wherein the organic acid is citric acid.

16. The method of preparing an improved plasticized polyvinyl acetal interlayer which comprises mixing a polyvinyl acetal resin with from 0.01 to 3.0 parts of at least one aliphatic organic acid which is selected from the group consisting of monocarboxylic acids of from 6 to 22 carbon atoms, dicarboxylic acids of from 4–12 carbon atoms, aliphatic monoamino monocarboxylic acids of from 2 to 6 carbon atoms, aliphatic monoamino dicarboxylic acids of from 4 to 5 carbon atoms, citric acid and mixtures thereof, adjusting the moisture content of the resin to 0.1 to 0.8% by weight, plasticizing the resin, and forming the interlayer.

References Cited

UNITED STATES PATENTS 3,231,461   1/1966   Mattimoe _____ 161—199

ROBERT F. BURNETT, Primary Examiner.

W. J. VAN BALEN, Assistant Examiner.